United States Patent [19]
Kayser

[11] 3,921,218
[45] Nov. 18, 1975

[54] THIN FILM MAGNETORESISTIVE TRANSDUCERS WITH ROTATED MAGNETIC EASY AXIS

[75] Inventor: Wolfgang W. O. G. Kayser, Paradise Valley, Ariz.

[73] Assignee: Honeywell Information Systems Inc., Waltham, Mass.

[22] Filed: Dec. 26, 1973

[21] Appl. No.: 428,581

[52] U.S. Cl. .......... 360/113; 340/174 EB; 360/125
[51] Int. Cl.².. G11B 5/14; G11B 5/28; G11C 11/14
[58] Field of Search .......... 360/113, 121, 124, 125; 324/46, 45; 340/174 EB; 29/603; 338/32

[56] References Cited

UNITED STATES PATENTS

| | | | |
|---|---|---|---|
| 3,271,751 | 9/1966 | Proebster | 360/125 |
| 3,418,163 | 12/1968 | Oberg et al. | 360/113 |
| 3,493,694 | 2/1970 | Hunt | 360/113 |
| 3,531,780 | 9/1970 | Huijer | 340/174 EB |
| 3,691,540 | 9/1972 | Almasi et al. | 340/174 EB |
| 3,716,781 | 2/1973 | Almasi et al. | 340/174 EB |
| 3,848,217 | 11/1974 | Lazzari | 360/113 |

*Primary Examiner*—Alfred H. Eddleman
*Attorney, Agent, or Firm*—Nicholas Prasinos; Ronald T. Reiling

[57] ABSTRACT

A thin film of magnetic material is deposited in a plurality of rows on the surface of a nonmagnetic substrate to form a multi-track readout transducer. The transducer is mounted adjacent a magnetic storage medium with the surface of the substrate at right angles to the surface of the storage medium. The magnetic material in the transducer is oriented so that the easy axis is skewed with respect to the plane of the magnetic storage medium positioned adjacent the transducer. This skewing of the easy axis facilitates more complete rotation of the magnetization of the thin film as magnetized portions of the storage medium and their respective stray fields move near the transducer. This skewing of the easy axis also increases signal output and improves the frequency response of the transducer.

3 Claims, 7 Drawing Figures

THIN FILM MAGNETORESISTIVE TRANSDUCERS WITH ROTATED MAGNETIC EASY AXIS

BACKGROUND OF THE INVENTION

This invention relates to thin film magnetoresistive transducers and more particularly to an array of thin film magnetoresistive transducers having the magnetic easy axis rotated with respect to the plane of a magnetic storage medium which is positioned adjacent the transducers.

In a high speed data processing system data is stored on magnetic tape or magnetic discs for retrieval and use at a later time. It is important that large quantities of data be stored as compactly as possible to minimize the number of reels of tape or the number of discs used with the data processing system. It is also important that data be located on the magnetic medium and retrieved as quickly as possible while the data is being processed. In order to do this, magnetic discs may use a large plurality of tracks of data with a transducer positioned over each of the tracks. Such read transducers must be very small when a large number of tracks are used and yet these read transducers should produce a comparatively large signal so that noise in the system will not interfere with the data being retrieved. In prior art thin film magnetoresistive transducers the easy axis of the thin film is oriented parallel to the surface of the magnetic storage medium. The output signal from these prior art thin film transducers is relatively low and the upper frequency response is limited.

The present invention alleviates some of the disadvantages of the prior art by using thin film technology to provide a magnetoresistive transducer having the easy axis skewed with respect to the plane of the surface of a magnetic storage medium which is positioned adjacent the transducer. This improves the response of the transducer by facilitating a more complete rotation of the magnetization of the thin film as magnetized portions of the storage medium move near the transducer. The more complete rotation of the magnetization of the magnetic film also increases the high frequency response of the transducer.

It is, therefore, an object of this invention to provide improved multi-track thin film magnetic transducers.

Another object of this invention is to provide a thin film magnetic transducer having improved sensitivity.

A further object of this invention is to provide a thin film magnetic transducer having improved high frequency response.

Still another object of this invention is to provide a thin film magnetic transducer having improved signal to noise ratio.

Another object of this invention is to provide an improved thin film magnetoresistive transducer.

Still another object of this invention is to provide a magnetoresistive transducer having improved sensitivity.

A further object of this invention is to provide an array of magnetoresistive transducers having shared terminals.

SUMMARY OF THE INVENTION

The foregoing objects are achieved in the present invention by employing a thin film of magnetoresistive material in a plurality of rows on a nonmagnetic substrate to form a multi-track readout transducer. The transducer is mounted adjacent a magnetic storage medium with the rows of magnetoresistive material at right angles to the surface of the storage medium. The thin anisotropic film is oriented so that the easy axis is skewed with respect to the plane of a magnetic storage medium positioned adjacent the transducer.

Other objects and advantages of this invention will become apparent from the following description when taken in connection with the accompanying drawings.

DESCRIPTION OF THE PREFERRED EMBODIMENT

Figure 1:
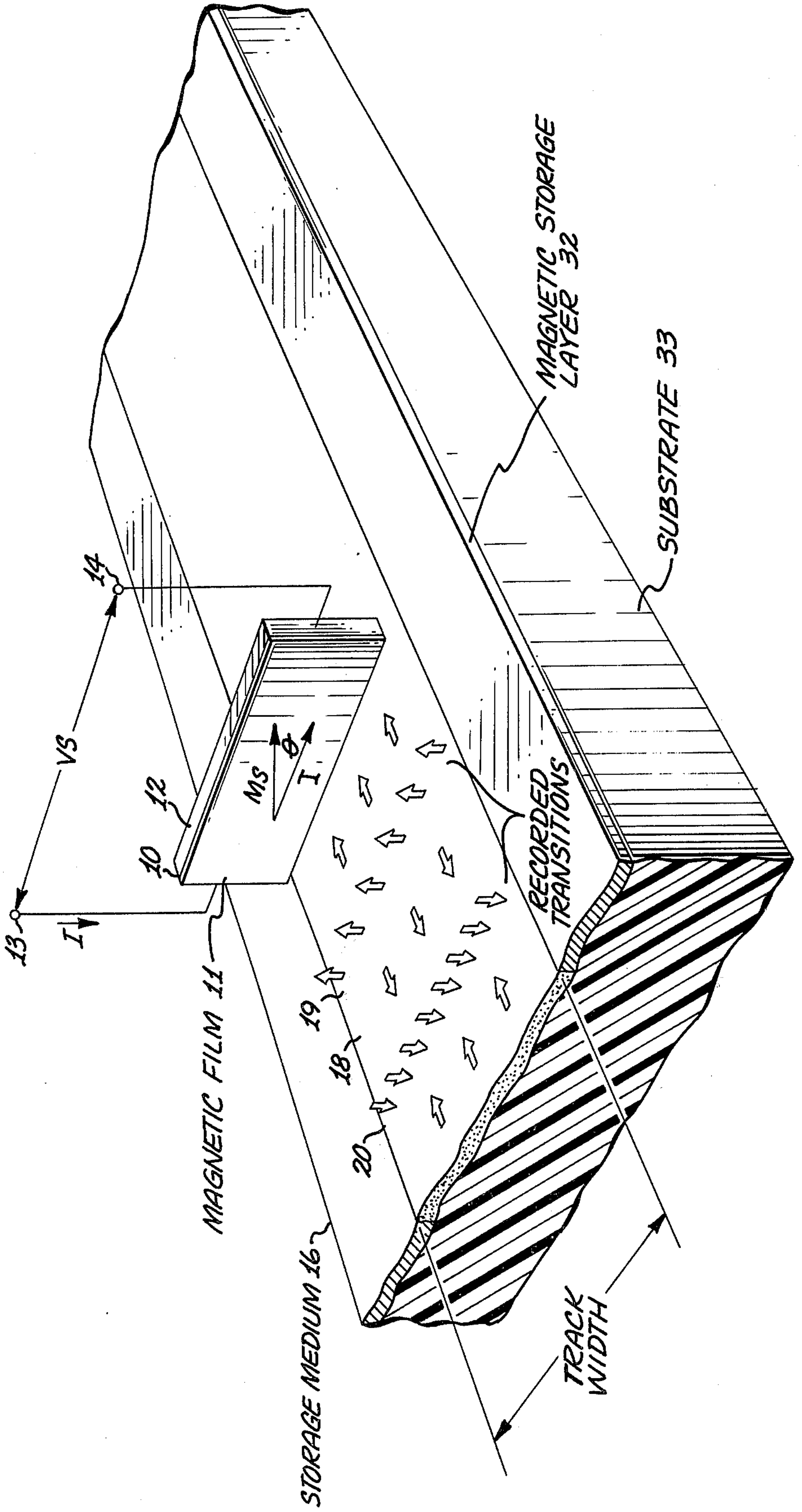
FIG. 1 illustrates a magnetoresistive transducer which may be used to read data from a magnetic medium.

FIG. 1 shows a magnetoresistive transducer 10 having a thin magnetic film 11, which is deposited on a non-conductive substrate 12. The magnetoresistive transducer 10 is mounted in a vertical position at right angles to the surface of a magnetic storage medium 16 which may be magnetic tape, magnetic disc, or magnetic ink characters on checks and credit cards. A large plurality of transducers may be mounted side by side and information recorded in a plurality of tracks, each of which pass under a corresponding one of the transducers. These transducers may be relatively small so that there are approximately one hundred to several thousand tracks per inch across the storage medium. A recording head (not shown) records the data or information in each of the tracks in the form of small magnetized areas of the medium. These magnetized areas may be represented by vectors which show the direction of a resulting magnetic field. For example, the tracks shown in FIG. 1 illustrates binary bits as small areas with arrows showing the direction of the magnetic field. In area 18 the magnetic field enters the tape at the transition 19 from below the magnetic layer, moves from left to right through the medium to transition point 20 and moves downward from the transition point. These vertical vectors at transition points 19 and 20 cause the magnetization of the magnetic film 11 to be oriented in alignment with the vectors in the storage medium as the magnetic storage medium moves under the transducer 10. As the transition 19 moves under the transducer 10, the magnetization of the magnetic film 11 is rotated in a downward direction and when the transition 20 moves under the transducer 10 the magnetization of the magnetic film is oriented in an upward direction. When the transducer 10 is over the area between transitions 19 and 20, the magnetization of film 11 is substantially oriented in a horizontal direction.

Certain magnetic materials may be deposited in a thin film on a sheet of nonmagnetic material. When these magnetic materials are deposited in the presence of a magnetic field, the thin magnetic film exhibits a property of uniaxial anisotropy. Uniaxial anisotropy is understood to mean that tendency of the magnetic moments throughout the film to align themselves along a preferred axis of magnetization. This preferred axis is often referred to as the "easy axis", while a direction of magnetization perpendicular to this axis in the plane of the film is referred to as a transverse or "hard axis" of the film. The uniaxial thin magnetic film exhibits a single easy axis of magnetization defining opposite stable states of remnant flux orientation. In one of these stable states the magnetization of the film may be aligned in one direction along the easy axis to represent a binary 1. In the other of these stable states the magnetization may be aligned in the opposite direction along the easy axis to represent a binary 0.

The value of resistance between terminals 13 and 14 is determined by the isotropic or fixed resistance of film 11 and by the orientation of the magnetization of the magnetic thin film 11 of transducer 10. The value of the magnetoresistance is proportional to the cosine of the angle between the current density vector, of FIG. 2, and the magnetization vector in the thin film. The direction of the magnetization vector in the thin film is the same as the direction of the magnetization vector 35 in the oxide layer 32 of the storage medium 16 when the magnetizing force is equal to or larger than the anisotropy field. When the magnetizing force is less than the value of the anisotropy field the direction of the magnetization vector is between the position of vector 24 and the +HA vector of FIG. 2. When a constant value of current I flows between terminals 13 and 14 the voltage between these terminals is determined by the isotropic resistance and by the direction of the magnetization in the thin film 11. Thus, the voltage across terminals 13 and 14 of FIG. 1 is determined by isotropic resistance and by the direction of magnetization of the storage medium 16 which is used to store data. This data is represented by binary 1's and binary 0's which are stored in the form of a magnetic field in the storage medium 16.

Figure 2:
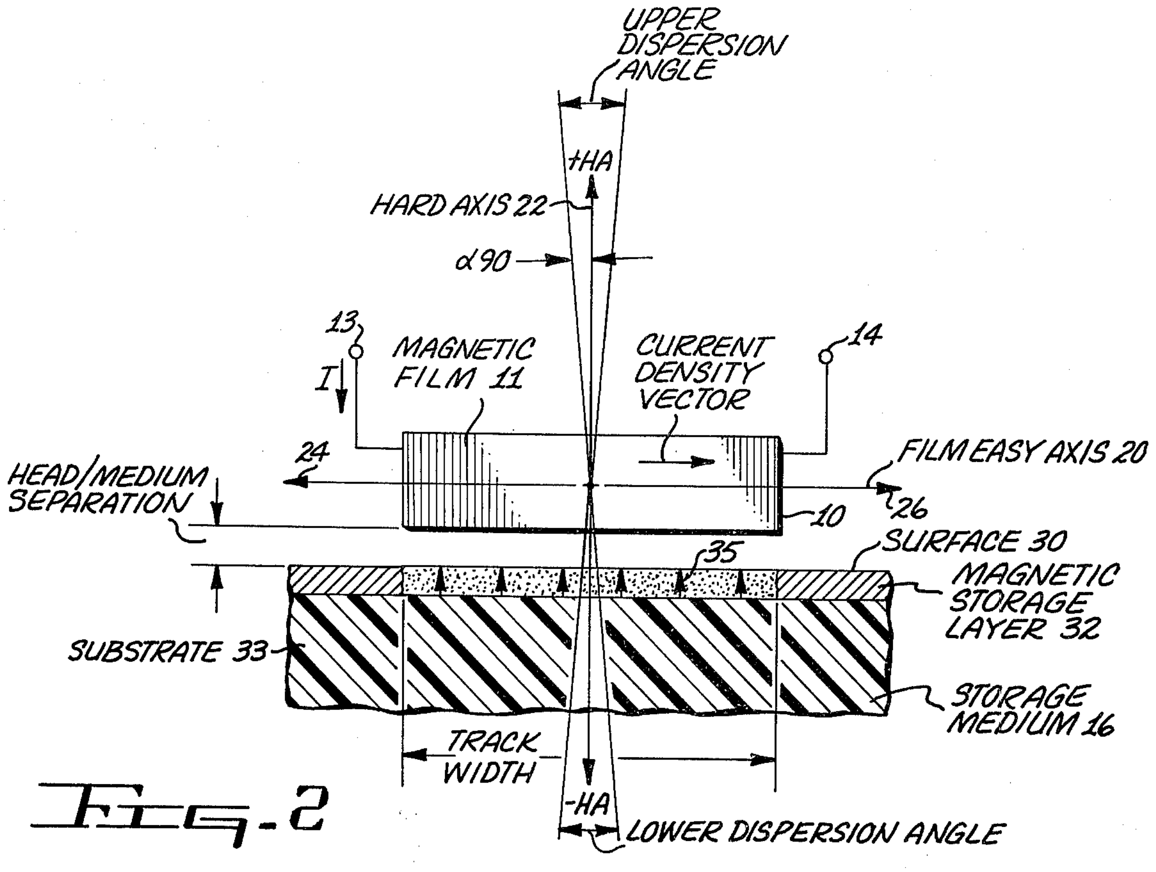
FIG. 2 illustrates the operation of a magnetoresistive transducer mounted with the easy axis parallel to the surface of the adjacent storage medium.

The operation of the prior art apparatus will now be described in connection with FIG. 2. The thin magnetic film 11 of the transducer 10 is saturated by aligning the magnetization in a horizontal direction with the easy axis 20 of the film being parallel to the surface 30 of the storage medium 16. This means that the magnetization of the film 11 will be oriented in the direction of vector 24 or in the direction of the vector 26 during the time when there is an absence of vertical vectors in the oxide layer 32 of the storage media. When the vertical vectors 35 and the oxide layer 32 are moved under the magnetic film 11 the magnetization in the film is rotated toward the position of the hard axis +HA. When the applied magnetizing force HA is equal to or greater than the force required to saturate, called HK, the film is oriented with 90% of the magnetization within the dispersion angle, $\alpha 90$. The applied magnetizing force is equal to or greater than HK when relatively large values of signals are used to magnetize the film 11. When the vectors 35 move away from film 11 any magnetization which is oriented in the direction of +HA within the upper dispersion angle may return to either the direction shown by vector 24 or to the direction shown by vector 26. Approximately one half of the magnetization will be aligned along vector 24 and the other half will be aligned along vector 26. The magnetization to the left of the upper dispersion angle will return to alignment along vector 24 and the magnetization to the right of the upper dispersion angle will return to alignment along vector 26. When the vectors 35 are reversed to point in a downward direction the magnetization is oriented into a position of the hard axis −HA. When the downward vectors 35 move away from film 11 the magnetization which is oriented parallel to −HA but within the lower dispersion angle may return to either the direction of vector 24 or the direction of vector 26. The speed of rotation of the magnetization could be increased and hysteresis losses reduced if all of the magnetization were oriented along either vector 24 or along vector 26 prior to the time that the vertical vectors 35 move adjacent the magnetic film. This would also cause an improvement in the output of the signal between terminals 13 and 14 of the transducer 10 and produce a higher upper frequency response.

Figure 3:
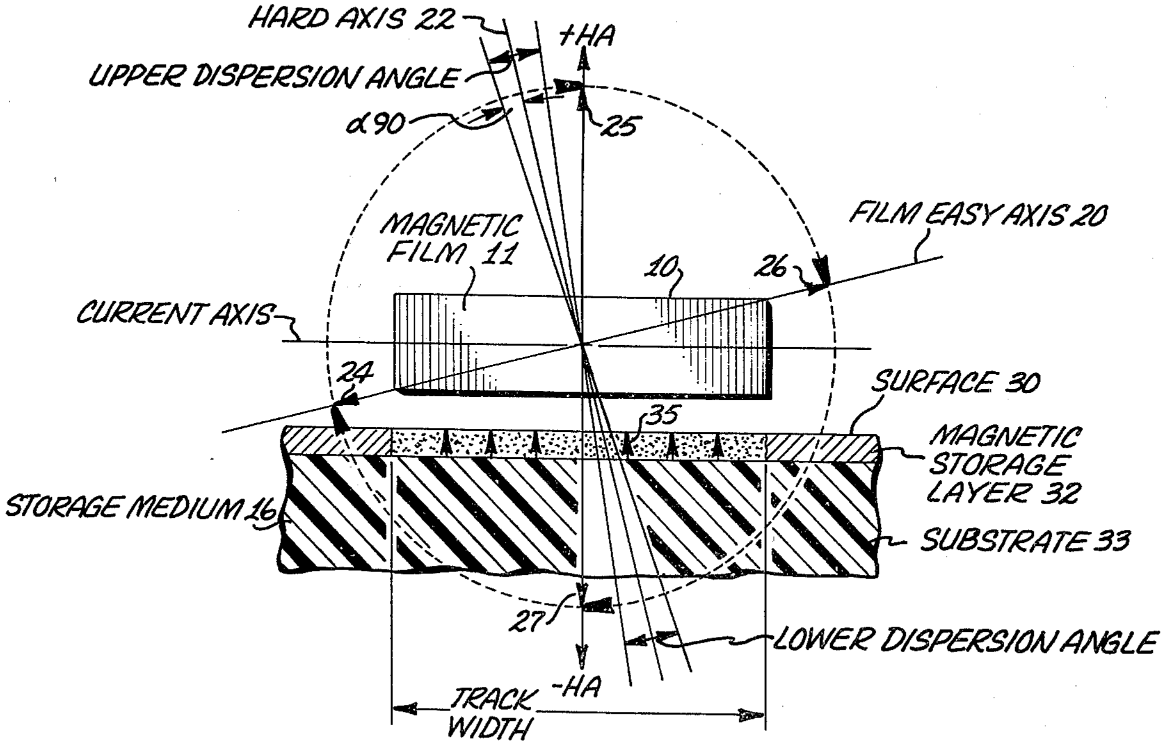
FIG. 3 illustrates the operation of the magnetoresistive transducer mounted with the easy axis slightly askew to the surface of the recording medium.

The present invention increases the speed of rotation of the magnetization and improves the signal from terminals 13 and 14 by rotating the easy axis 20 of the magnetic film into a position which is no longer parallel with the surface 30 of the storage medium 16. When the magnetic film 11 is saturated along the easy axis 20 which is slightly askew with respect to the surface 30 of the storage medium 16, approximately one half of the magnetization will be aligned along vector 24 as shown in FIG. 3 and the other half of the magnetic particles will be aligned along vector 26. When vectors 35 and oxide layer 32 are oriented in the upward direction the magnetization in film 11 is aligned in the direction of the +HA axis along vector 25. When vectors 35 move away from film 11 the magnetization is to the right of the upper dispersion angle and will move from the position of vector 25 to the position of vector 26. When vectors 35 are oriented in a downward direction the magnetization oriented along the vector 26 will be rotated to the position shown by vector 27. Since the magnetization is rotating in a coherent direction the speed of remagnetization is increased over the condition where half of the magnetization was along vector 24 and the other half was oriented along vector 26. When vectors 35 move away from the magnetic film 11 the magnetization which was oriented along vector 27 rotate to the position of vector 24. If at this time vectors 35 are again oriented in a downward direction, the magnetization which is oriented along vector 24 will be moved into the position along vector 27.

When relatively small values of signals are used to magnetize the film 11 the output signals from terminals 12 and 13 of FIG. 1 are relatively small. The value of the output signals may be increased by providing a magnetic bias field which shifts the operating point on the characteristic transfer curve as shown in FIG. 5.

Figure 5:
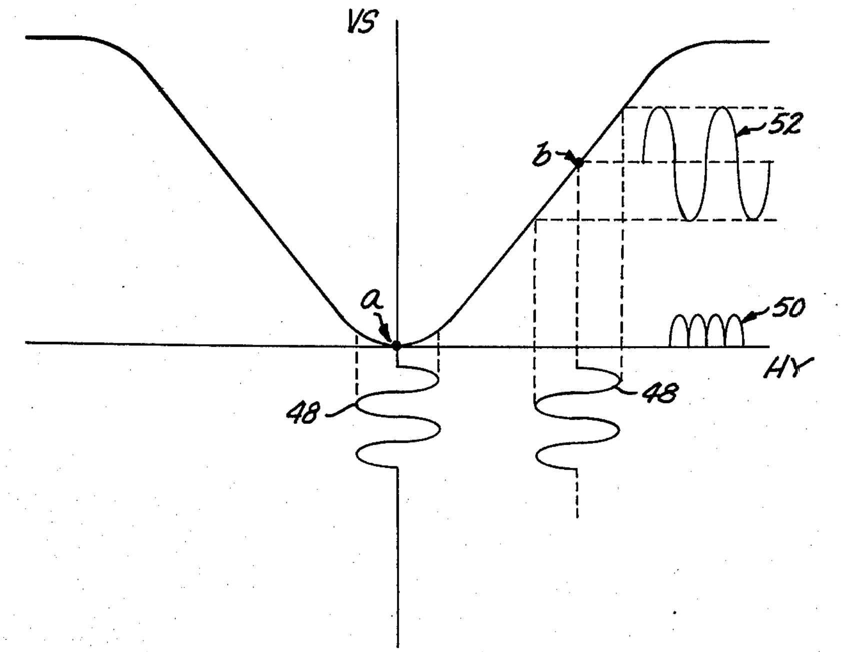
FIGS. 5–7 illustrate apparatus for increasing the amount of signal output from a transducer.

The curve in FIG. 5 shows the output signal voltage Vs plotted against the input applied field Hv. When the apparatus of FIG. 1 is used the input signal 48 is applied to operating point *a* of FIG. 5 resulting in the output signal 50. The low value of the slope of the curve near point *a* causes the amplitude of the output signal 50 to be relatively small. When a magnetic bias is applied to the apparatus the input signal 48 is applied to operating point *b* resulting in the output signal 52. The steeper slope of the curve near point *b* causes the amplitude of the output signal 52 to be much larger than signal 50.

Figure 6:
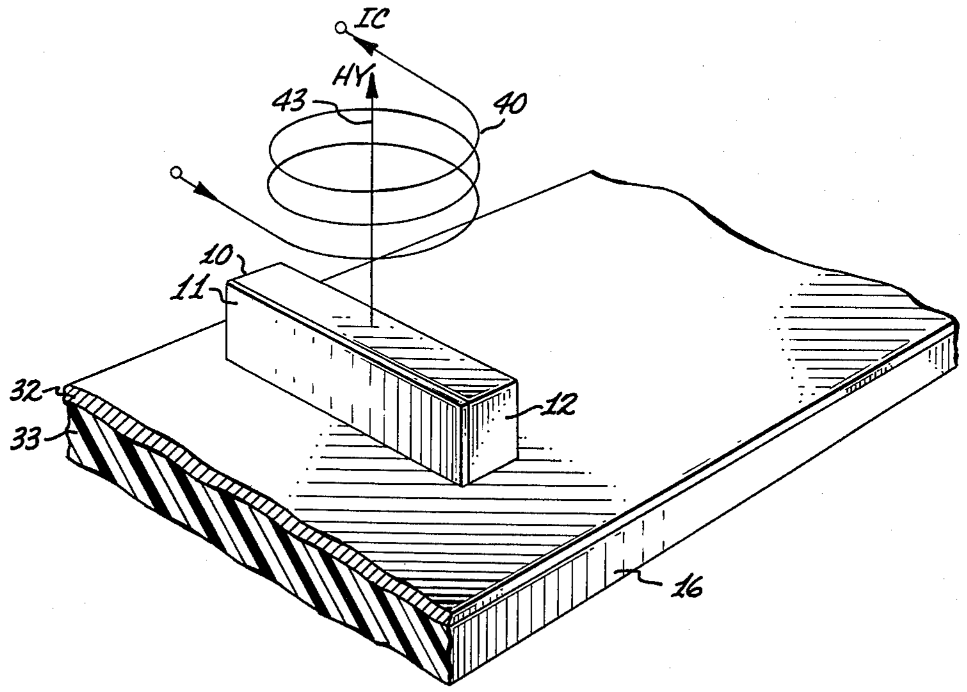

The magnetic bias may be obtained by using a permanent magnet, by electric current in an air coil as shown in FIG. 6, or by other bias means. FIG. 6 shows a coil 40 having a plurality of windings mounted adjacent the transducer 10. A current Ic flowing in the windings produces a magnetic bias field in a vertical direction as shown by vector 43. This magnetic bias field causes the operating point of FIG. 5 to move upward on the transfer characteristic curve, for example from point *a* to point *b*.

Figure 7:
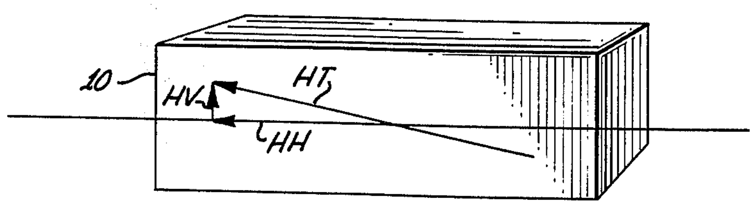

The skewed easy axis as shown in FIG. 3 provides a "built in" magnetic bias for the apparatus without using any external components. The operation of the skewed easy axis for biasing is shown in FIG. 7 with the magnetization along the easy axis as shown by vector HT. This vector HT can be resolved into vector HH, in the horizontal direction and vector HV, in the vertical direction. The vertical vector HV is in the same direction as the bias vector 43 of FIG. 6 so that the rotated easy axis of the transducer moves the operating point on the characteristic curve to a more linear portion of the curve near point *b*. Thus, the skewed easy axis of the transducer is self-biasing so that the biasing coil of FIG. 6 is not needed.

Figure 4:
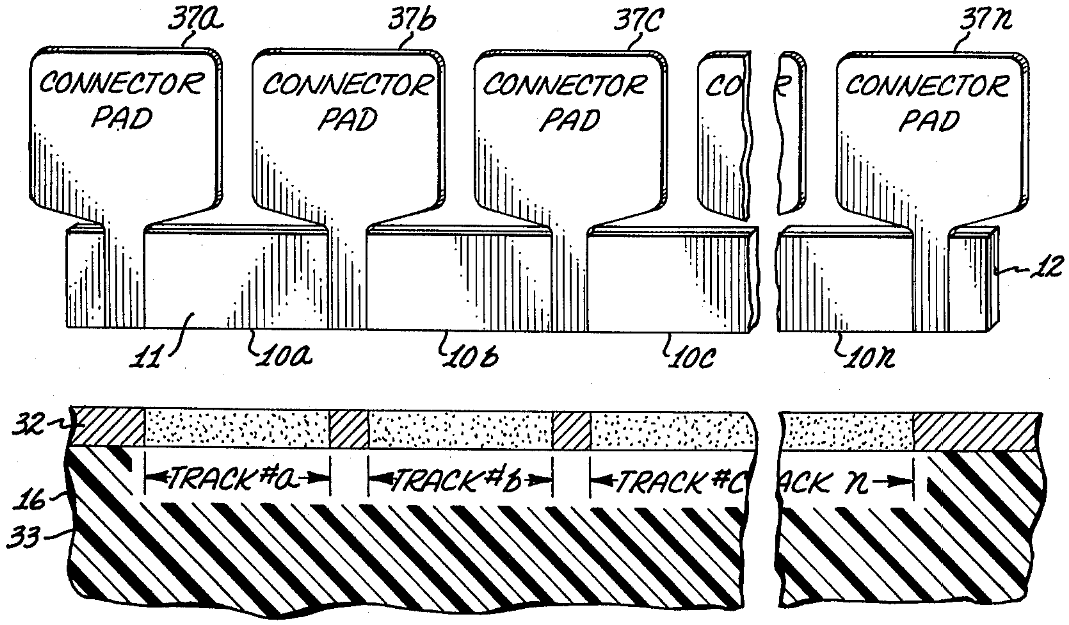
FIG. 4 illustrates a plurality of magnetoresistive transducers having shared terminals.

FIG. 4 illustrates details of the construction of one embodiment of magnetic heads which includes a plurality of vertical magnetoresistive transducers. A thin magnetic film 11 is deposited upon the surface of a substrate 12. A plurality of terminals or connector pads 37*a*–37*n* are connected to the magnetic film at intervals to form a plurality of magnetoresistive transducers 10*a*–10*n*. The terminals are shared by the transducers. For example, terminal 37*b* is a connector for transducers 10*a* and 10*b*. A voltage or current applied to terminal 37*b* may cause a current to flow to terminal 37*a* or to terminal 37*c*, depending upon the value of the voltages at these terminals. The shared terminals are each larger than terminals in apparatus which uses a separate pad for each end of each of the conductors. Thus, the embodiment shown in FIG. 4 increases the amount of current that the conductor between transducers can carry without increasing the distance between these terminals. The illustrated embodiment of FIG. 4 shows three transducers and four terminals, but it should be understood that a greater or lesser number may be used.

While the principles of the invention have now been made clear in an illustrative embodiment, there will be many obvious modifications of the structure, proportions, materials and components without departing from those principles. The appended claims are intended to cover any such modifications.

I claim:

1. A multitrack recording head having a plurality of magnetoresistive transducers for use with a magnetic storage medium, said recording head comprising:

an elongated substrate;

a magnetic film, said film being deposited upon the surface of said substrate, said substrate being mounted adjacent said storage medium so that the surface of said substrate is substantially at right angles to the surface of said storage medium;

a plurality of terminals, said terminals being connected to said film at space intervals along said substrate; and the plurality of magnetoresistive transducers sharing said common terminal spaced therebetween.

2. A multitrack recording head as defined in claim 1 wherein: said magnetic film is oriented with magnetization along an easy axis, said easy axis being slightly askew with respect to the surface of said storage medium.

3. A multitrack recording head as defined in claim 1 wherein: said magnetic film is oriented with magnetization along an easy axis, said easy axis making an angle greater than $\alpha$ 90 with the surface of said storage medium.

* * * * *